United States Patent [19]

Koch et al.

[11] Patent Number: 4,618,519

[45] Date of Patent: Oct. 21, 1986

[54] TIRE REPAIR BY "PATCH ONLY" METHOD

[75] Inventors: Russell W. Koch, Hartville, Ohio; Douglas D. Snyder, Tempe, Ariz.

[73] Assignee: The Firestone Tire & Rubber Company, Akron, Ohio

[21] Appl. No.: 718,666

[22] Filed: Apr. 1, 1985

Related U.S. Application Data

[63] Continuation-in-part of Ser. No. 584,426, Feb. 28, 1984, abandoned.

[51] Int. Cl.⁴ .............................................. B32B 3/26
[52] U.S. Cl. ...................... 428/63; 152/367; 428/36
[58] Field of Search ........................ 428/63; 427/140

[56] References Cited

U.S. PATENT DOCUMENTS

| | | |
|---|---|---|
| 3,143,156 | 8/1964 | Fagert et al. |
| 3,644,256 | 2/1972 | Broisman ............... 156/335 |
| 3,718,587 | 2/1973 | Bhakuni et al. ........ 252/8.6 |
| 3,755,261 | 8/1973 | VanGulick ............. 528/65 |
| 3,779,794 | 12/1973 | DeSantis ............... 156/329 |
| 3,834,934 | 9/1974 | Broisman ............... 156/335 |
| 3,888,831 | 6/1975 | Kogon .................... 252/182 |
| 3,966,530 | 6/1976 | Cutts ..................... 156/314 |
| 3,991,255 | 11/1976 | Blaskiewicz et al. ... 156/333 |
| 4,085,283 | 4/1978 | Otter ..................... 544/214 |
| 4,125,522 | 11/1978 | Becker ................... 528/67 |
| 4,136,219 | 1/1979 | Odam .................... 427/385.5 |
| 4,143,454 | 3/1979 | Utsunomiya et al. ... 427/385.5 |
| 4,158,378 | 6/1979 | Pearson et al. ......... 152/353 R |
| 4,240,852 | 12/1980 | Gomberg et al. ....... 156/96 |
| 4,300,970 | 11/1981 | Honda et al. .......... 156/244.11 |
| 4,311,181 | 1/1982 | Hausch ................. 152/353 R |
| 4,327,138 | 4/1982 | Hausch ................. 428/36 |
| 4,352,704 | 10/1982 | Williams et al. ....... 156/125 |
| 4,399,852 | 8/1983 | Hausch ................. 152/353 R |
| 4,401,145 | 8/1983 | Hausch ................. 152/353 R |
| 4,434,832 | 3/1984 | Koch et al. ............ 152/370 |
| 4,465,535 | 8/1984 | Fieldhouse et al. ..... 156/97 |
| 4,485,135 | 11/1984 | Koch ..................... 428/36 |

FOREIGN PATENT DOCUMENTS 1352645 5/1974 United Kingdom .

OTHER PUBLICATIONS

Product No. PS-2682-71, Hughson Chemical Div., Lord Corp.

"Room Temperature Vulcanizing Adhesive Based on Ethylene-Propylene-Diene Terpolymer," by Canton, Uniroyal, paper No. 18, Rubber Chemistry Div. of American Chemical Society, Denver, Colo., Oct. 10, 1973.

Primary Examiner—Christopher A. Henderson
Attorney, Agent, or Firm—Daniel N. Hall

[57] ABSTRACT

A repaired elastomer article having a cut or crack entirely therethrough. An interior cavity is located in the vicinity of the cut or crack and has a filler therein. A treating agent is located about the cut portion on the inner surface of the article and an amine curable polymer or prepolymer resides over said treating agent. A cured elastomeric patch resides over said amine curable polymer or prepolymer. Since the amine curable polymer or prepolymer cures at ambient temperatures, the repair of the elastomer article can occur in situ. The invention is especially useful in the repair of tires.

7 Claims, 2 Drawing Figures

TIRE REPAIR BY "PATCH ONLY" METHOD

CROSS-REFERENCE

The present invention is a continuation-in-part of currently pending U.S. application Ser. No. 584,426 filed Feb. 28, 1984, for "Tire Repair By "Patch Only" Method" now abandoned in favor of a continuation application bearing Ser. No. 767,998, filed Aug. 21, 1985.

TECHNICAL FIELD

The present invention relates to a composition and method for the repair of elastomeric articles having a crack/cut therein which is repaired with a cured patch. More specifically, the present invention relates to creating a cavity in the damaged interior portion of the elastomer, applying a filler to the cavity, and to the use of a treating agent and an amine curable polymer to adhere the patch to the interior crack/cut area. The cure is at ambient temperature.

BACKGROUND ART

Heretofore, reinforced rubber articles such as giant tires having an opening therein have been repaired utilizing an uncured patch. Generally, the tire was taken to a retread or rubber repair shop where the damaged area was removed. Generally, an all-purpose gum rubber was applied to the opening. On the interior side of the article, the general area of the opening was buffed and a conventional rubber cement applied thereto. Then, an uncured patch was applied. The gum rubber as well as the adhesive was then cured in a mold by applying heat thereto or through utilizing steam heat for a period of approximately 8 to 12 hours.

Prior art patches fall into two classes, the chemical cure patches which are high in cost and provide only poor adhesion to the substrate and uncured patches which require the use of heat for proper cure and adhesion. Unlike the method of heat application for the gum rubber filler, a rather sophisticated process must be used to cure this latter type of patch, to wit, a tire mold or similar device. Thus when a patch is required, an on-the-spot or in situ repair is exceedingly cumbersome at best and in most cases impossible, requiring the article to be returned to a repair shop.

The present invention utilizes a cured rubber patch secured to the elastomer substrate through an adhesive system which is curable at ambient temperatures. There is therefore no need for the use of a tire mold to effect repair and the article can easily and quickly be treated in the field, saving both time and expense. The adhesive system utilizes an amine curable polyurethane or other prepolymer and a treating agent.

Considering the prior art, U.S. Pat. Nos. 3,755,261 to VanGulick; 3,888,831 to Kogan; 3,834,934 to Broisman; 3,644,256 also to Broisman; and 3,718,587 to Bhakuni relate to amine curable curing agents, amine curable polymers, or R.F.L. type adhesives. However, these patents lack any suggestion of applicants' internal cavity, treating agent or repair of an elastomer article.

U.S. Pat. No. 3,779,794 to DeSantis relates to a moisture-curable polyurethane sealant primer system, whereas U.S. Pat. No. 4,085,283 to DenOtter relates to frame retardants utilized in cyanuric acid derivatives. Hughson Chemical Division, Lord Corporation, Product No PS-2682-71 relates to a surface primer for elastomeric substances utilizing a proprietary compound thought to be Mono- or di-chloroisocyanuric acid. An article entitled "Room Temperature Vulcanizing Adhesive Based on Ethylene-Propylene-Diene Terpolymer," Cantor, Uniroyal, Paper No. 18, presented to the Division of Rubber Chemistry of the American Chemical Society, Denver, Colorado, Oct. 10, 1973 relates to various oxidants which effect ambient temperature cures of E.P.D.M.

U.S. Pat. No. 4,136,219 to Odam relates to a polyurethane paint which is applied to vulcanized rubbers. British Pat. No. 1,352,645 relates to a polyurethane paint which is applied to vulcanized rubbers.

U.S. Pat. No. 4,125,522 to Becker relates to a polyurethane adhesive, whereas U.S. Pat. No. 3,966,530 to Cutts relates to triazoline diones which are utilized in lieu of chlorinated or halogenated donors for treating elastomeric surfaces to improve adhesion.

U.S. Pat. No. 3,143,156 relates to utilizing a non-fully cured plug to repair an aperture.

U.S. Pat. No. 4,143,454 to Utsonomiya relates to a method of attaching connecting parts of an offshore structure wherein a liquid rubber is applied over a treating solution which may contain a halogen molecule. As such, this reference lacks applicants' treating agent as well as repair of an elastomeric article having a patch thereon.

U.S. Pat. No. 4,158,378 to Pearson relates to a cured rubber tire having a specific polyurethane therein and to a chlorine water treatment. Hence, Pearson also fails to teach or suggest applicants' recited treating agent as well as the patched article.

U.S. Pat. No. 3,991,255 to Blaskjiewicz relates to the adhesion of a polyurethane to an EPDM surface utilizing various adhesives, however Blaskjiewicz does not use his treating agent to form a treating layer and utilizes elevated temperatures.

U.S. Pat. No. 4,300,970 to Honda does not disclose amine curable resins or an ambient temperature cure.

U.S. Pat. No. 4,240,852 to Gomberg relates only to the use of a cyanoacrylate adhesive.

U.S. Pat. No. 4,352,704 to Williams relates to applying tire tread to a tire. This patent lacks any suggestion of applicants' treating agent or the repair of a tire aperture.

U.S. Pat. Nos. 4,327,138 and 4,399,852 to Hausch fail to disclose a cured rubber patch in repairing a rubber article. Similarly U.S. Pat. Nos. 4,401,145 and 4,311,181 also to Hausch relate to an indicia and not to any cured path.

U.S. Pat. Nos. 4,434,832 to Koch and Barbin and 4,485,135 to Koch relate to ambient temperature cure of elastomers having a hollow therein as well as a patch.

U.S. Pat. No. 4,465,535 to Koch, Fieldhouse and Oziomek relates to the use of a specific solvent, 1,4-dichloro-ethane, utilized in connection with a treating agent.

One prior art method of repairing a tire article relates to the utilization of a proprietary compound thought to be a mixture of rubber and accelerators which is applied to the aperture and then cured. In general, a very poor adhesion results and heat is required.

However, none of the above patents, methods, etc. relate to the creation of an interior cavity in a damaged are which cavity is filled with a filler, covered with a cured patch and adhered thereto with an ambient temperature curable amine curing agent.

DISCLOSURE OF THE INVENTION

It is therefore an aspect of the present invention to provide a repaired reinforced elastomer article in which an interior cut portion thereof has a cavity filled with a filler and covered by a cured rubber patch.

It is a further aspect of the present invention to provide a reinforced elastomer article as above, in which an amine curable polymer and a treating agent adheres said patch to said article.

It is still a further aspect of the present invention to provide a reinforced elastomer article as above, in which said amine curable polymer or prepolymer cures at ambient temperature and said repair can be made in situ.

It is a further aspect of the present invention to provide a reinforced elastomer article as above, whereby further crack or cut propagation is abated or eliminated.

It is a further aspect of the present invention to provide a reinforced elastomer article as above, wherein said cured rubber patch has cords therein.

These and other aspects of the present invention will become apparent from the following specification.

In general, a repaired elastomer article comprises the elastomer article, said article having a crack/cut extending therethrough; said article having a cavity formed in the interior vicinity of said crack/cut; a filler, said filler residing in said interior cavity; a treating agent, said treating agent residing at least on the interior portion of said elastomer article surrounding said filler; an amine curable polymer or prepolymer, said amine curable polymer or prepolymer residing on said treating agent; a cured elastomeric patch, said patch residing on said amine curable polymer or prepolymer; said amine curable polymer or prepolymer bonded to said patch and to said article at ambient temperature.

BEST MODE FOR CARRYING OUT THE INVENTION

Figure 1:
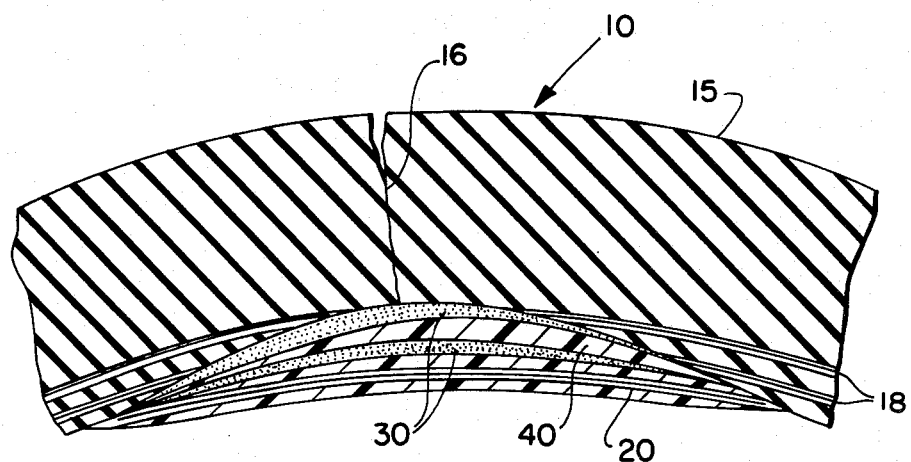
FIG. 1 is a cross sectional view showing the repair of a reinforced elastomer article having a crack/cut extending completely therethrough.

A reinforced elastomer article having a crack or a cut therein, that is a crack/cut, is repaired by utilizing a cured elastomer patch preferably having cords therein. The patch is used to repair the crack/cut which generally extends through the elastomer article. The patch is generally applied on the non-initially cut or internal side of the article and the cut itself, if an opening exists, generally need not be filled. Portion 15 of the article is shown having a cut or crack therein. For the purposes of the present invention, the cut or crack (crack/cut) generally extends through the entire article such that it is in need of repair. Article 10, such as a tire, conveyor belt or the like, generally has reinforcement therein such as in the form of cords 18. When crack 16 extends through the article having a pressurized gas therein, such as a tire, the article will gradually lose pressure unless the loss of gas is stopped. The loss of air pressure in a tire naturally makes it unsuitable for use.

The crack/cut can be caused by a number of items such as nails, bolts, screws, metal objects, rocks, spikes, equipment, and the like. The invention is ideally suited for large off-the-road tires although it can also be applied to normal passenger car tires, truck tires, conveyor belts, and the like.

In order to repair the elastomer article, the interior side, or that side of the article opposite the initial cut penetration, is prepared for the application of the patch thereto. Such preparation generally includes removal of the tire innerliner layer as well as removal of one or more layers located immediately thereunder. Since usually the cords in the area of the crack/cut are often damaged, they can be severed, outside of the damaged area, and removed. Oftentime portions of two or more of the tire cords are removed. The remaining exposed area is then buffed via any conventional apparatus or treatment. It is then cleaned utilizing conventional solvents such as acetone, rubber solvent, trichlorethane, and the like. Treating agent 30 is then applied to the cleaned area and allowed to dry. An amine curable polymer or prepolymer is then applied thereover. A cured patch 20 having a layer of treating agent 30 on one side thereof is then applied to the amine curable polymer or prepolymer layer 40. The thickness of the amine curable polymer or prepolymer 40 can vary but generally is between 1/6" to $\frac{1}{8}$" thick and covers the area buffed out.

Upon cure, the repair obtained is usually equal to or stronger than the strength of the original article. Moreover, should the cut be large enough such that an opening exists on the exterior side, there is generally no need to fill said cut.

Another distinctive advantage of the present invention is that the amine curable polymer cures at ambient temperature. Thus, the repair can be made on the job site. That is, there is no need to take the tire or the article to the nearest retread shop or rubber repair shop which on some occasions can be hundreds of miles away.

Considering now the article to be repaired, or substrate 15, it is a cured rubber or elastomer, having unsaturated groups therein. The substrate can be any conventional elastomer or rubber known to those skilled in the art. For example, it can be made from conjugated dienes having from 4 to 12 carbon atoms such as butadiene, isoprene, and the like. It can also be made from natural rubber, that is from a substance which is obtained from various trees and plants which grow in the tropics or desert portions of the world. Such natural rubber generally has a content in excess of 90 and usually in excess of 95 percent of cis-1,4-polyisoprene. The substrate can also be made from various elastomeric copolymers such as those made from monomers of conjugated dienes having from 4 to 12 carbon atoms, as set forth above, and vinyl substituted aromatic compounds having from 8 to 15 carbon atoms. Examples of such vinyl substituted aromatic compounds include styrene, alpha-methylstyrene, and the like. An example of a specific copolymer is styrene-butadiene rubber.

Naturally, other types of rubber compounds can be utilized such as the so-called butyl rubbers, neoprene, that is polychloroprene, and the like, as well as blends of said above rubbers.

Suitable treating agents include the various N-halohydantoins, the various N-haloamides, the various N-haloimides, and combinations thereof. Examples of various desirable N-halohydantions include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acids. A preferred treating composition for use in the practice of the present invention are the various mono-, di-, or trichloroisocyanuric acids, or combinations thereof. Trichloroisocyanuric acid is especially preferred.

The treating agents usually exist in solid form. They are readily soluble in solvents such as acetone and the like and thus can be applied in liquid form. Application of the treating agent generally occurs at ambient temperatures. Application can occur through any conventional manner as through brushing, spraying, and the like. The amount applied is such that the rubber substrate surface is coated. Preferably, two or more coats of the treating agent or adhesive compound are used to ensure that all the cured rubber substrate surface has been coated.

A typical amount of the treating agent in the suitable solvent, for example ethyl acetate or acetone, is generally from about 0.1 about 10 percent by weight based upon the total weight of said treating agent and solvent, and preferably from about 0.5 percent to about 5 percent. Of course, higher or lower concentrations can be utilized. This solvent system has been found to dry within a matter of minutes so that the amine curable polymer or prepolymer can be bonded to the treating agent. It is thought that the adhesive treating system adds halogen groups, for example, chlorine to the cured rubber which activates the cured rubber surface allowing the amine curable polymer or prepolymer system to adhere strongly to the cured rubber surface.

Of the various amine curable polymers or prepolymers, the urethanes are preferred. Other prepolymers or polymers which can be cured with the amine curing agent include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212–221; halogen-containing hydrocarbon polymers such as chloroprene polymers, chlorinated butyl rubber, and chlorinated polyethylene and polypropylene; chlorosulfonated polymers such as those described in U.S. Pat. No. 2,723,257; polymers containing acid halide groups such as

and haloformate groups such as

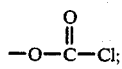

polymers containing anhydride groups which on reaction with diamines yield amide-acid linkages, and organo-polysiloxanes as described in U.S. Pat. No. 2,938,010.

The urethane prepolymers or polymers, that is, those which contain isocyanate groups, are generally formed by first reacting a polyether polyol or a polyester polyol with a molar excess of a diisocyanate to form a prepolymer having terminal isocyanate groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948;691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester-based coating polymer with approximately 2.4 percent isocyanate end groups, manufactured by American Cyanamid. Blends of these polyurethanes can also be utilized. Moreover, it has been found, particularly with repair or application of the amine curable polymer to the patch area, that is the area between patch 20 and cured substrate 11, better adhesion is often obtained by utilizing two different types of urethane. For example, a urethane containing a high amount by weight of isocyanate end groups such as Adiprene L-367 can be blended with a urethane containing a low amount by weight of isocyanate end groups such as Adiprene L-42. The amount of one urethane to the other can range from about 1 to 99 percent and desirably from about 30 to about 70 percent by weight.

To the amine curable prepolymer or polymer compound is added a conventional amine curing agent, known to those skilled in the art. Generally, any conventional or known amine curing agent can be used and, hence, only a few specific examples will be given. Thus, the curing agent can be MOCA, that is 4,4'-methylene bis(2-chloroaniline) or, desirably a complex of 4,4'-methylene dianiline and a salt, or a complex of racemic 2,3-di-(4-aminophenyl) butane and a salt, as set forth in U.S. Pat. No. 3,755,261 to VanGulick which is hereby fully incorporated by reference. The latter two complexes are preferred. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes or salts derived from 4,4'-methylene dianilne are highly preferred. Another class of amine curing agents which can be utilized are the various Versamides, that is the condensation products of polyamines and dibasic acids obtained when certain unsaturated fatty acids are polymerized, and are manufactured by Henkel Chemical Company.

The equivalent weight of the curing agent utilized with regard to the curable prepolymer or polymer, generally ranges from about 85 percent to 115 percent with from about 95 to 105 percent being preferred.

Often to facilitate processing, the curing agent, and especially an amine curing agent such as the complex of 4,4'-methylene dianiline and a salt is utilized with a plasticizer such as dioctylphthalate on a 50 percent weight basis, or Flexol 4-GO, tetraethylene glycol bis(2-ethyl hexanoate) manufactured by Union Carbide Corporation on a 50 percent weight basis. The amount of plasticizer can range from about 20 percent to about 60 weight percent.

The curing agent is blended with the prepolymer or polymers in various mixers such as dough mixers, high speed impellers, paddle-type mixers, and the like. Small batches can be mixed by stirring with a spatula. Usually, the prepolymer or polymer is a liquid. If not, when mixed with the polar solvent, a liquid mixture results. However, even if a solid curing agent is used, when added to the prepolymer or the polymer, and to a solvent system, a liquid system results even though the curing agent (e.g., amine) can be in the form of a dispersion. Thus, even though the system may contain solids therein, the solids exist in the form of a dispersion so that a liquid system is produced.

The curing agent and the amine curable polymers or prepolymers form the curable polymer system which is mixed with a polar solvent so that a liquid system is obtained which cures at ambient or room temperature, that is, the prevailing temperature as from about 10° C. to about 50° C. Often the ambient temperature will range from about 15° C. to about 35° C. or 40° C. The polar solvents which can be utilized, especially with the amine curing agent and the amine polymers or prepolymers are, for example, set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred. The amount of curing agent, based upon said polymer or prepolymer, ranges from about 0.85 to about 1.15 equivalents.

Considering patch 20, it can generally be of any desired size so long as it adequately covers the surface area of the aperture. Generally, an appropriate patch size will be known to one skilled in the art of patch construction and/or patch application. The patch is made of rubber and is generally fully cured. Although cured natural rubber of a composition containing at least 80 percent by weight of natural rubber is often preferred, any conventional type of cured rubber compound can be utilized. Thus, the patch can be made from a conjugated diene having from 4 to 12 carbon atoms, copolymers made from conjugated dienes having from 4 to 12 carbon atoms with vinyl substituted aromatics having from 8 to 15 carbon atoms, for example styrene butadiene rubber, and the like. In essence, the patch can be made out of the same type of rubber as the substrate. Often, the patch will have a cushioned layer thereon to alleviate stresses formed between the tire carcass and tire patch. However, this is not always necessary.

Since in the preferred embodiment of the present invention the substrate has cords therein, desirably the patch also has cords therein. More specifically, whenever approximately 25 percent to about 50 percent of the cords are damaged, severed, broken, etc., the strength of the cords in the patch is approximately equal to the strength of the total cords in the article before any injury thereto. However, should approximately 50 percent to 100 percent of all cords be damaged, severed, or otherwise injured, the strength of the cords in the patch is equal to the strength of the total cords in the article before injury thereto. Should the number of damaged cords in the article be less than approximately 25 percent, then, the strength of the remaining cords is usually adequate such that a reinforced patch need not be utilized. The cords in the patch can be made of polyester, nylon, steel, rayon and the like, with nylon being preferred.

The area around the cut or crack is buffed and cleaned as set forth above. Treating agent 30 is applied and then the amine curable polymer or prepolymer is applied. Treating agent 30 is also applied to one side of the patch. The ends of the patch can be taped to the substrate or held in place with a curing tube located inside the tire. The number of cords of the patch is as previously set forth. While the patch is held in place, the amide curable polymer or prepolymer cures at ambient temperatures.

In forming the amine curable polymer system, generally the amine curable polymer or prepolymer is mixed with the polar solvent and then the curing agent is added last. During cure, an effective and strong bond is formed between the prepolymer or polymer system and the treated elastomer substrate. Since the present invention relates to an ambient temperature cure, repair of large and cumbersome articles such as off-the-road tires, conveyor belts, and the like, can be made in situ. In other words, the repair can be made at the job site. The only accessory which may be required is a pneumatic bladder, although a sand bag can be used. In extreme cold weather it is desirable to bring the damaged area of the tire, through the use of heating pads, up to ambient temperature. Since the cure is ambient, no steam chambers, or other vulcanizable tire repair equipment are required. This, of course, also results in an energy savings.

It is to be understood that various conventional additives in conventional amounts can be added to the amine curing agent and prepolymer systems such as colorants, softeners, fillers, antioxidants, plasticizers, and the like.

The invention will be better understood by reference to the following representative samples.

EXAMPLES

A tire which was determined to have an air leak was repaired in accordance with the present invention as follows:

The interior portion of the tire at which the air leak was determined was thoroughly buffed utilizing an OTR buffing tool. In this manner, the innerliner and the tiegum layer were removed down to the first body ply. Then, any damaged body cords were carefully removed. The buffed portion was then cleaned by vacuuming out the last traces of any buffing dust and the like. Next the buffed area was thoroughly cleaned with acetone on Rymplecloth. Generally, the area buffed and cleaned was about 12" to 24" to 12" to 24", then, a patch of a size set forth in the table was lightly buffed and cleaned in the same manner. The treating agent was applied in several coats as a 3 percent solution of trichloro-s-triazinetrione in ethyl acetate. This was allowed to dry. Then, the amine curable urethane system was applied which comprise the following two components: "A" side, 150 gm Adiprene L-367, 150 gm Adiprene 42, 30 gr 4G0 and 30 gm of acetone; "B" side, 73 gm Caytur 21.

The thoroughly mixed polyurethane was then coated on to the buffed area of the tire and also to the reinforcing patch which was fully cured and contained no uncured layer. The patch containing the urethane thereon was applied to the buffed portion of the tire which had also previously been treated with the treating agent.

The patch was taped into place and firmly held by inflating a curing tube inside the tire. After standing approximately 16–18 hours at an ambient temperature, tape was removed and the tire was placed back into service. The following results were obtained.

| TIRE # | TIRE SIZE | PATCH SIZE | ORIGINAL HOURS | REPAIR HOURS | RECENT STATUS |
|---|---|---|---|---|---|
| 1 | 36.00 × 51 | 12" × 12" | 2606 | 1587 | Worn out |
| 2 | " | 12" × 12" | 2763 | 984 | Worn out |
| 3 | " | 12" × 12" | 2068 | 1371 | Off, second rock cut in the tire |
| 4 | " | 12" × 12" | 671 | 1647 | Still in service |
| 5 | " | 15" × 15" | 2784 | 744 | Off, second rock cut in the tire |
| 6 | " | 18" × 18" | 1643 | 575 | Off, patch failed |

As readily apparent from the Table, patches were quite effective in that in Tires #1 and #2, the tire actually wore out. The remaining tires are still in service or have obtained a second rock cut or the patch failed (not the adhesive). With regard to Tire #6, it is noted that the first repair failed because of a weak patch. However, upon replacement with a stronger patch, the performance of the repair improved.

From the above Table, it can be seen that a patch according to the present invention is very effective in repairing the tire as well as sealing air leaks therein.

According to another concept of the present invention, an elastomer article is repaired by making a cavity in the vicinity of the interior crack or cut. The cavity is then filled with a suitable filler and a patch applied thereover.

Figure 2:
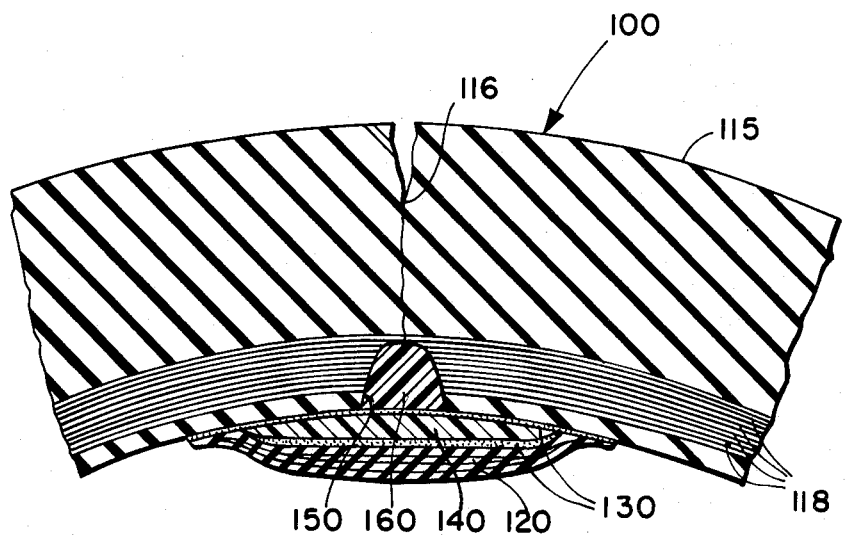
FIG. 2 is a cross sectional view of a reinforced elastomer having a filled cavity as well as a cured patch thereover on the interior side of the elastomer article.

Referring to FIG. 2, an elastomer article is generally disclosed by the numeral 100. The elastomer is generally made from a conjugated diene, or a copolymer made from a conjugated diene and a vinyl substituted aromatic as set forth hereinabove. The article can generally be any reinforced elastomeric article such as a tire, a conveyor belt or the like. The reinforcement is generally in the form of cords 118. A portion of 115 of the article is shown having a crack or cut 116 extending therethrough and the repair structure and method of the present invention generally relates to such an article.

According to the present invention, a cavity 150 is made in the elastomer from the interior side thereof in the vicinity of or in the injured area. Although the area of the cavity generally is kept as small as possible, it is important that any injury or damaged area, and especially any damaged reinforcement cords, be removed. Inasmuch as the crack/cut extends through article 110, usually some of the cords and often most if not all of cords 118 will be damaged and hence should be removed in the injured area. Removal can be through the use of any suitable method such as skiving and the like. In skiving, generally a very sharp tool, for example having a tungsten carbide tip, is utilized. The depth of the cavity is usually into the reinforcement area and not beyond. Thus, for a tire, the cavity will extend through the inner liner, through the tiegum layer which bonds the inner liner to the reinforcement area, and into the reinforcement area wherein any damaged reinforcement cords have been removed. Once the cavity has been made, it is desirable to clean it out through a suitable means such as a solvent, for example acetone, or the like. Since cracks or cuts have a variety of sizes, the general diameter of the formed cavity will vary and in a tire can be from about ½" to about 3". The depth of the cavity in a tire such as in a large off-the-road tire can extend up to approximately 1½". Of course, these figures can vary greatly depending upon the size of the tire, or other elastomer article.

After cavity 150 has been cleaned, filler 160 can be added thereto. The filler can be any suitable material which generally has some elasticity therein. In other words, a material is preferred which has a modulus similar to the elastomer article. Other requisites of filler 160 is that it adhere to the elastomer and also impart strength thereto. Examples of suitable fillers include gum rubber as set forth in U.S. Pat. No. 4,434,832, hereby fully incorporated by reference; various polymers such as amine curable polymers or prepolymers, amine curable compositions having rubber particles therein and the like. Inasmuch as various polymers must be cured at elevated temperature, although they can be utilized, they are not desired in the present invention. Desired polymers include the amine curable polymers and prepolymers inasmuch as they are curable at ambient temperatures. Examples of suitable amine curable polymers and prepolymers include those set forth hereinabove which are hereby fully incorporated by reference as well as the various amine curable polymers and prepolymers set forth in U.S. Pat. No. 4,485,135, also hereby fully incorporated by reference. A suitable amount of the polymer is added to fill the cavity. Although the crack or cut may be large enough such that an opening exists on the exterior side of article 100, there is generally no need to fill said opening.

Optionally and preferably, before filler 160 is added to cavity 150, a treating agent is applied or coated on the surfaces thereof when the filler is an amine curable polymer or prepolymer such as a polyurethane. Otherwise, a treating agent is not desired. Treating agent 130 can be applied in any manner as by brushing or the like and usually is dissolved in a solvent. Upon drying, it forms a coating which forms a very strong bond to the amine curable filler 160. In other words, the use of treating agent 130 improves adhesion of the amine curable filler to the elastomer article. Suitable types of treating agents are as set forth hereinabove such as the various N-halohydantoins, the various N-haloamides, the various N-haloimides, and combinations thereof. Such treating agents are hereby fully incorporated by reference as well as are the various types and amounts of solvents utilized therewith. As noted above, the various mono-, di-, or trichloroisocyanuric acids, or combinations thereof are preferred.

Once a cavity has been filled with filler 160, cured patch 120 can be applied to the interior portion of the elastomer. However, the interior surface of the article surrounding the cavity is generally prepared as by cleaning, for example, by a mechanical means as by buffing, and/or with a solvent. Treating agent 130, if desirable, is then applied to the area surrounding the cavity and desirably to the filled cavity surface itself which generally is flush with the interior surface of the elastomer article. Treating agent 130 is the same type of agent as utilized to coat the inner surfaces of the cavity as immediately set forth above. The deposition of a layer of treating agent upon the interior surface is desired so that a good bond is formed between the article and the amine curable polymer or prepolymer. The treating agent is also applied to cured patch 120 which is also prepared as by buffing and cleaning with a solvent.

The patch is generally of any desired size so long as it adequately covers the cavity as well as extends a sufficient distance thereabout. Generally, an appropriate size patch will be well known to one skilled in the art of patch construction and/or patch application. The patch type as well as material and reinforcement therein is the same as set forth above and is hereby fully incorporated by reference. Essentially, the patch is made out of rubber and has cords therein. The number of the cords will generally vary with the number of cords in elastomer article 100 which have been damaged and/or removed. The strength of the cords within the patch is generally as set forth hereinabove will regard to FIG. 1. For example, should approximately 50 percent to 100 percent of all cords be severed or removed, the strength of the cords in the patch is generally equal to the strength of the total cords in the article before any injury thereto. Also as noted above, the cords in the patch can be made out of any suitable material such as polyester, nylon, steel, rayon, and the like with nylon being preferred.

The patch is then applied over the cavity area with the treating agent layer residing on said cleaned patch surface facing the cavity or interior portion of the elastomer. To form a good bond between the patch and the elastomer article, an amine curable polymer 140 is utilized. This amine curable polymer or prepolymer can be the same as utilized in the cavity and is also the same as material 40 noted above with regard to FIG. 1. That is, the amine curable polymer or prepolymer is generally a urethane polymer or prepolymer having a molecular weight when cured in excess of 10,000. Typical examples as previously noted can include the various polyurethanes manufactured by DuPont under the Adiprene trademark and the like.

To the amine curable polymer or prepolymer, either in the form of filler 160 or layer 140, is added a conventional amine curing agent known to those skilled in the art and as discussed above and hereby incorporated by reference including the amount used as well as any solvents, especially polar solvents. For example MOCA, methylene dianiline and a salt, or the like can be utilized. Should the filler be gum rubber or other polymers, conventional curatives can be utilized in conventional amounts, as is well known to the art.

Since the amine curable polymers or prepolymers as noted above are curable at ambient temperatures, that is from about 10° C. to about 50° C. and preferably from about 15° C. to about 35° or 40° C., the patch can be bonded to the elastomer article at ambient temperatures. In fact, when filler 160 is the desired amine curable polymer or prepolymer, it can also be cured at ambient temperatures.

The repair construction or method set forth immediately above with regard to FIG. 1 can be utilized on various items such as a tire. Generally, large tires such as off the road tires which have been cut or have a crack therein such that air is lost or are severely lacerated, require reinforcement. According to the present invention, such tires can be repaired on the job site, in situ and at ambient temperature. That is no heat or mold is required. Accordingly, the tire does not have to be taken to a nearby tire repair shop and thus less labor and time is required to repair the injury. The repair of the present invention has also been found to abate and stop crack or cut propagation or growth as well as stop rocks and other foreign materials from penetrating into the patch area.

The invention will be better understood by reference to the following examples.

EXAMPLES

The general preparation of the tire is as follows:

The center of the injury with regard to a large off the road tire is located. The innerliner and tiegum layer down to the first body ply as well as any other damaged body plies is removed. It is important to remove the damaged plies as well as the damaged area to prevent cut growth of the injury. Cut growth is defined as an increase in the size of the cut due to stress applied to the tire. To aid in removal of the damaged cords, a pencil rod tungsten-carbide tool can be used. The amount of non-damaged material removed is kept to a minimum. Next, the cavity created by removal of the damaged area including the body plies is buffed if possible. Desirably, the patch to be installed should also be buffed as is the area about the cavity. The size of the patch is desirably larger than the cavity. The cavity is then cleaned to remove the last traces of the buffing dust as by vacuuming, brushing or the like. Next, a clean Rymplecloth with acetone thereon is used to thoroughly clean the buffed area. This procedure is repeated until only a faint gray coloration is observed on the Rymplecloth. The solvent cleaned area is then allowed to dry. A treating agent, as described above, is applied to the cavity, to the area about the cavity, and to the patch, and permitted to dry. The treating agent can be applied in a few coats in a suitable solvent. After drying, an amine curable system is applied which comprises the two following compositions: The first composition contains 150 grams of Adiprene L-367, 150 grams of Adiprene 42, 30 grams of 4G0, and 30 grams of acetone. The second composition contains approximately 73 grams of Caytur 21. The two urethane compositions were then thoroughly mixed and applied to the cavity to an extent that it was essentially filled to the interior surface of the tire. The urethane system is also applied over the treated buffed area of the tire as well as of the patch. Then the patch was applied to the tire over the cavity area, held in place by tape and inflating a curing tube inside the tire, and allowed to dry at ambient temperature. After approximately 12–18 hours at ambient temperature, the tape was removed and the tire placed back into service.

In accordance with the above general procedure, the following tires were treated.

TABLE

| TIRE # | BRAND # OF TIRE | PATCH SIZE | REPAIR HOURS | ORIGINAL HOURS | CURRENT STATUS |
|---|---|---|---|---|---|
| 1 | 36.00 × 51 | 12" × 12" | 5324 | 1653 | Removed Ply Separation |
| 2 | " | 14" × 14" | 865 | 879 | Redo Patch Failed |
| 3 | " | 14" × 14" | 744 | 2784 | Second rock cut in tire |
| 4 | " | 18" × 18" | 625 | 1408 | Cut too large |
| 5 | " | 16" × 16" | 931 | 2769 | Second |

TABLE-continued

| TIRE # | BRAND # OF TIRE | PATCH SIZE | REPAIR HOURS | ORIGINAL HOURS | CURRENT STATUS |
|---|---|---|---|---|---|
| 6 | " | 12" × 12" | 1123 | 1927 | rock cut in tire Running |
| 7 | " | 12" × 12" | 1276 | 2271 | Running |
| 8 | " | 14" dia. (Round Patch) | 540 | 2660 | Tread separation |

In all cases, the removal of the tire was not due to failure of the adhesive or tire repair procedure of the present invention. Moreover, it is noted that the procedure of the present invention gave a very surprising and unexpected result in that this procedure is opposite from standard tire repair practices. That is, it is steadfast and understood by the industry that the whole tire must be repaired in order to make a durable repair.

As apparent from the table, it can be seen that a tire repair having an interior cavity as well as a patch thereover is very effective in repairing the tire as well as sealing air leaks therein.

While in accordance with the present invention, a preferred embodiment and best mode has been set forth, various modifications can be made to the invention without departing from the spirit thereof. Accordingly, the scope of the invention is measured by the scope of the attached claims.

What is claimed is:

1. A repaired elastomer article, consisting essentially of the elastomer article, said article having a crack/cut extending therethrough;
   said article having a reinforcement area, said article having a cavity formed in the interior vicinity of said crack/cut, said cavity interiorly extending inclusively into said reinforcement area;
   a filler, said filler residing in said interior cavity;
   a treating agent, said treating agent residing at least on the interior portion of said elastomer article surrounding said filler;
   an amine curable polymer or prepolymer, said amine curable polymer or prepolymer residing on said treating agent;
   a cured elastomeric patch, said patch residing on said amine curable polymer or prepolymer;
   said amine curable polymer or prepolymer bonded to said patch and to said article at ambient temperature.

2. A repaired elastomer article according to claim 1, wherein said elastomer article reinforcement area has cords therein and wherein said formed cavity extends into said cords and wherein said patch has cords therein.

3. A repaired elastomer article according to claim 2, wherein said treating agent resides on the area surrounding said cavity, and on said patch, and wherein said amine curable polymer or prepolymer is selected from the group consisting of (a) epoxy resins; (b) halogen-containing hydrocarbon polymers; (c) chlorosulfonated polymers; (d) polymers containing acid halide groups such as

or haloformate groups such as

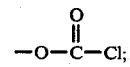

(e) polymers containing anhydride groups which, on reaction with diamines, yield amide-acid linkages, (f) organopolysiloxanes; (g) urethane polymers or prepolymers; and combinations thereof, and wherein said treating agent is selected from the group consisting of 1,3-dichloro-5-5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; N-bromosuccinimide, and mono-, di-, or trichloroisocyanuric acid.

4. A repaired elastomer article according to claim 3, wherein said cavity filler is an amine curable polymer or prepolymer, and wherein said amine curable polymer or prepolymer is bonded at a temperature of from about 10° C. to about 50° C.

5. A repaired elastomer article according to claim 4, wherein said treating agent is selected from the group consisting of monochloroisocyanuric acid, dichloroisocyanuric acid, trichloroisocyanuric acid, and combinations thereof.

6. A repaired elastomer article according to claim 5, wherein said amine curable polymer or prepolymer is said urethane polymer or prepolymer and wherein said bonding occurs at a temperature of from about 15° C. to about 30° C.

7. A repaired elastomer article according to claim 6, wherein the number of cords in said patch is approximately equal to or greater than the strength of the cords in said elastomer article.

* * * * *